US011441064B2

(12) United States Patent
Elkatatny et al.

(10) Patent No.: US 11,441,064 B2
(45) Date of Patent: Sep. 13, 2022

(54) METHOD OF REMOVING IRON-CONTAINING SCALE FROM A WELLBORE, PIPE, OR SURFACE USING A BIODEGRADABLE DESCALER SOLUTION

(71) Applicant: King Fahd University of Petroleum and Minerals, Dhahran (SA)

(72) Inventors: Salaheldin Elkatatny, Dhahran (SA); Mohamed Mahmoud, Dhahran (SA); Hany Gamal, Dhahran (SA); Abdullah Sultan, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/733,476

(22) Filed: Jan. 3, 2020

(65) Prior Publication Data

US 2021/0207019 A1    Jul. 8, 2021

(51) Int. Cl.
*E21B 37/06* (2006.01)
*C09K 8/528* (2006.01)
(Continued)

(52) U.S. Cl.
CPC .............. *C09K 8/528* (2013.01); *C09K 8/536* (2013.01); *E21B 37/04* (2013.01); *E21B 37/06* (2013.01)

(58) Field of Classification Search
None
See application file for complete search history.

(56) References Cited

U.S. PATENT DOCUMENTS 4,381,950 A     5/1983  Lawson
2009/0247431 A1*  10/2009  Gupta ................ C09K 8/74
                                        507/237
(Continued)

FOREIGN PATENT DOCUMENTS

CA      2 345 305       11/2006
CA      2 656 344       4/2013
MX      2010010834 A    12/2010

OTHER PUBLICATIONS

Al-Khaldi, et al.; Geochemical Reaction Mechanisms, and Production Enhancement Applications for Citric Acid; Society of Petroleum Engineers; 2003; Abstract Only; 2 Pages.
(Continued)

*Primary Examiner* — Andrew Sue-Ako
(74) *Attorney, Agent, or Firm* — Oblon, McClelland, Maier & Neustadt, L.L.P.

(57) ABSTRACT

A method of removing iron-containing scale from a wellbore, pipe, or metal-containing surface involving contacting the iron-containing scale with a biodegradable descaler solution of water, hydrochloric acid, formic acid, citric acid, a corrosion inhibitor, a corrosion inhibitor intensifier, and a surfactant. The method is performed at a pressure of 14 to 400 psi and a temperature of 100 to 150° C. The method removes iron-containing scale made of iron sulfide, iron carbonate, iron oxyhydroxide, and calcium carbonate. The method meets industry standard steel corrosion rates of less than 0.049 lb/ft$^2$ per day. Also disclosed is a biodegradable descaler solution of water, hydrochloric acid, formic acid, citric acid, a corrosion inhibitor, a corrosion inhibitor intensifier, and a surfactant that meets OECD 301B thresholds for ready biodegradability.

15 Claims, 2 Drawing Sheets

(51) Int. Cl.
*C09K 8/536* (2006.01)
*E21B 37/04* (2006.01)

(56) References Cited

U.S. PATENT DOCUMENTS

| | | | |
|---|---|---|---|
| 2013/0274155 A1 | 10/2013 | Nasr-El-Din et al. | |
| 2013/0281329 A1* | 10/2013 | De Wolf | C09K 8/72 562/571 |
| 2014/0287968 A1* | 9/2014 | Reyes | C09K 8/528 507/241 |
| 2016/0264849 A1* | 9/2016 | Oliveira | C09K 8/72 |
| 2017/0198198 A1* | 7/2017 | Mahmoud | C09K 8/532 |
| 2018/0347316 A1* | 12/2018 | Peng | C09K 8/532 |

OTHER PUBLICATIONS

Gadiyar, et al. ; Chemical Cleaning, Decontamination and Corrosion ; Government of India Atomic Energy Commission ; 1991 ; 24 Pages.

Nasr-El-Din, et al. ; An Experimental Study of Removing Iron Sulfide Scale From Well Tubulars ; Society of Petroleum Engineers ; 2000 ; Abstract Only ; 2 Pages.

* cited by examiner

METHOD OF REMOVING IRON-CONTAINING SCALE FROM A WELLBORE, PIPE, OR SURFACE USING A BIODEGRADABLE DESCALER SOLUTION

BACKGROUND OF THE INVENTION

Technical Field

The present invention relates to a method for removing iron-containing scale from a wellbore, pipe, or metal-containing surface using a biodegradable descaler solution.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The formation of insoluble scale is one of the major problems in the oil and gas industry. One of the most prominent types of scale is iron-containing scale or iron scale. Iron scale is formed due to the presence of iron and other substances such as hydrogen sulfide or carbon dioxide that form insoluble iron precipitates in all types of petroleum wells such as: producer, injector, disposal, and water supply. Kasnick and Engen [Kasnick, M. A. and Engen, R. J., 1989, SPE Middle East Oil Technical Conference and Exhibition, SPE 17933], Nasr-El-Din et al. [Nasr-El-Din, H. A., et. al., 2000, Corrosion 2000, NACE 00439], and Chen et al. [Chen, T., et. al., 2009, SPE Symposium on Oil Field Chemistry, SPE 121456] stated that iron scale will cause many operational problems by blocking fluid flow through wellbores, surface pipelines, and surface facilities. Additionally, the formation of iron scale can affect the performance of downhole tools such as production logging tools, and it can increase the corrosion rate within pipeline networks. Further, iron scale will interfere with the safe operation of pipe line valve systems.

Iron scale depositions have an adverse impact to production and injection operations. Cord-Ruwisch et al. [Cord-Ruwisch, et. al., 1987, Journal of Petroleum Technology, 39, 1, 97-106] stated that the precipitation of iron scale in the near-wellbore can diminish the productivity of a production well. Cusack et al. [Cusack, F., et. al., 1987, SPE Annual Technical Conference and Exhibition, SPE 16907] and Nasr-El-Din and Al Humaidan [Nasr-El-Din, H. A., and Al-Humaidan, A. Y., 2001, International Symposium on Oilfield Scale, SPE 68315] concluded that the deposition of iron scale in the near-wellbore can prevent the injection of water in water injection wells.

The presence of $H_2S$ causes the formation and precipitation of iron sulfide compounds. Nasr-El-Din et al. [Nasr-El-Din, H. A., et. al., 2001, SPE International Symposium on Oilfield Chemistry, SPE 65028] stated that precipitation of iron sulfide in pipelines presents a significant problem because they hinder accurate determinations of pipeline structural integrity and the pipelines must be cleaned physically. Additionally, the oil-wetting nature of iron sulfide can change the wettability of the rock surface from water-wet to oil-wet. Further, the iron sulfide allows the precipitation of asphaltene in the area around the wellbore, which will reduce the effective permeability available for the oil flow and, in turn, reduce oil production.

The iron scale deposits block flow of the natural resources by clogging perforations or forming a thick lining in the production tubing. The scale deposits damage wellbore equipment, such as heating turbines, heat exchangers, safety valves, casings, production tubing, mandrels, pipes, separators, pumps, and gas lift valves. If the iron scale deposits are not removed, the wellbore production capacity can diminish drastically, and in some cases, the iron scale causes the wellbore production to be shut down for a period of time to remove the scale or change the production tubing. Additionally, iron scale containing iron sulfide materials can promote the corrosion of wellbore or surface pipes. Iron sulfide materials deposits tend to stabilize oil-water emulsions that may form during secondary oil recovery [Taylor, K. C., et. al., 1999, SPE Journal, 4, 1, 19-24].

Iron sulfide exists in several forms. The phase of iron sulfide is heavily dependent upon on how rich the scales are in sulfur and ferric ions. The iron sulfide type further depends on factors such as the temperature and age of the scale. Iron sulfide may be present in iron scale in a variety of crystalline phases having different sulfur to iron ratios. The different phases of iron sulfide scale include; pyrrhotite ($Fe_7S_8$), troilite (hexagonal FeS), marcasite (orthorhombic $FeS_2$), pyrite (cubic $FeS_2$), greigite ($Fe_2S_4$), and mackinawite ($Fe_9S_8$). In the same deposit, several types of iron sulfide might exist. Hard or insoluble scales may exist at shallower depths compared to the soft or soluble scales. Therefore, a single treatment is difficult to design for a single well because, for example, HCl can remove FeS, but it cannot remove the $FeS_2$. Therefore, two different chemical treatments or both chemical and mechanical treatments may be required to remove both FeS and $FeS_2$.

Various sources can produce sulfide ions during different operational processes. Commonly in sour gas wells, hydrogen sulfide can be produced as free gas. Hydrogen sulfide is also produced due to injecting with high sulfate content. Seto and Beliveau [Seto, C. J., and Beliveau, D. A., 2000, SPE/CERI Gas Technology Symposium, SPE 59778] and Kasinck and Engen [Kasnick, M. A. and Engen, R. J., 1989, SPE Middle East Oil Technical Conference and Exhibition, SPE 17933] stated that the source of hydrogen sulfide is sulfate reducing bacteria (SRB), thermo-chemical sulfur reduction, thermal decomposition of organic sulfur compound, acid treatment of deep sour wells, and hydrolysis of metal sulfides.

The iron ions may come from the formation brine or by the corrosion of the tubing which is controlled by using effective corrosion inhibitors. During acidizing, acid can be contaminated at each stage with iron from the surface tanks or from the well pipes. This will inevitably cause iron scale deposits in the formation or in the wellbore. Hall and Dill [Hall, B. E. and Dill, W. R., 1988, SPE Formation Damage Control Symposium, SPE 17157] stated that before injection, acids can dissolve rust of storage tanks, mixing of rust with acids can lead a mixture of iron (II) and iron (III). During injection, mill scale and corrosion products can be dissolved in the acid, resulting in a large amount of iron ions in the solution. Iron-containing minerals in the formation are another source of iron such as chlorite clay mineral, iron carbonate compounds, etc. Taylor et al. [Taylor, K. C., et. al., 1999, SPE Journal, 4, 1, 19-24] concluded that iron compounds that precipitate during acidizing can decrease the permeability of the reservoir.

In many cases, the formed iron sulfide scale has a heterogeneous chemical composition that imparts unique and varied properties, such as sulfur-to-iron ratio, density, solubility, and hardness. This non-homogenous nature warrants investigation and understanding of these properties to develop proper treatments to remove or mitigate scale. The physical state of iron sulfide scale may vary from viscous fluid to dry black powder. The physical and chemical properties of iron sulfide scale are a function of factors such as temperature, pressure, age of scale, and pH. Iron is usually present in a +2 or +3 oxidation state. At typical surface facilities and conditions, all the iron is present in +3 oxidation state. At normal reservoir conditions, iron is present in a +2 oxidation state. Taylor et al., Crowe [Crowe, C. W., 1985, Journal of Petroleum Technology, 37, 4, 691-695], and Crowe [Crowe, C. W., 1986, International Meeting on Petroleum Engineering, SPE 14090] stated that based on the analysis of different field samples, it was observed that ratio of iron (II) to iron (III) is 5 to 1. However, that ratio can vary in different types of wells and formations. Typical iron sulfide scale deposits are shown in FIG. 1.

Wang et al. [Wang, Q., et. al., 2013, SPE Saudi Arabia Section Technical Symposium and Exhibition, SPE 168063] have shown that HCl can be used to remove the soft type of iron sulfide scale (FeS). The major problem of using HCl to remove soft scale is the high rate of steel corrosion, especially at high temperature. In addition, acid dissolution reaction generates large amount of $H_2S$ gas which can be a serious issue for well integrity and can increase operational risk at surface facilities.

Mahmoud et al. [Mahmoud, M. A., et. al., 2015, International Petroleum Technology Conference, IPTC 18279] introduced a new formulation that can remove pyrite ($FeS_2$) iron sulfide scale from oil and gas wells. The tested scale contained more than 80% pyrite. They used DTPA (20 wt % at pH of 11) chelating agent at high pH and potassium carbonate as a catalyst. The proposed formulation dissolved 85% of the scale at 158° F. for 48 hrs. They suggested several catalysts that can enhance the dissolution rate of the pyrite scale such as potassium carbonate, cesium formate, and cesium carbonate. The catalyst can be added to the DTPA chelating agent at concentrations higher than 3 wt % to achieve good dissolution of the pyrite scale.

Wang et al. also used different formulations to remove different compositions of iron sulfide scales. The scale samples they used consisted of pyrrhotite ($Fe_7S_8$), Mackinawite (FeS), Pyrite ($FeS_2$), Marcasite ($FeS_2$), Calcite, Siderite, and Anhydrite. They used different concentrations of THPS (from 15 to 75 wt %) for soaking time ranging from 1 hr. to 24 hrs. They also investigated the effect of ammonium chloride salt on the scale dissolution process. They found that 50 wt % THPS (Tetrakis Hydroxymethyl Phosphonium Sulfate) yielded the highest removal efficiency. The addition of ammonium chloride enhanced the scale solubility because it produced HCl but it increased the corrosion rate at 185° F.

In view of the foregoing, one objective of the present invention is to provide a one-step method for the chemical removal of iron-containing scale using a biodegradable descaler solution. This method achieves high removal efficiency while surpassing industry requirements for low steel corrosion rate. Another objective is to provide a biodegradable descaler solution for the removal of iron-containing scale. The solution meets OECD 301B requirements for ready biodegradability.

BRIEF SUMMARY OF THE INVENTION

According to a first aspect, the present disclosure relates to a method for removing an iron-containing scale from a wellbore, pipe, or other metal-containing surface involving contacting the iron-containing scale with a biodegradable descaler solution comprising 55.75 to 80.49 wt % of water, 16.0 to 22.5 wt % of hydrochloric acid, 0.75 to 7.5 wt % of formic acid, 0.75 to 7.5 wt % of citric acid, 1.0 to 3.0 wt % of a corrosion inhibitor, 1.0 to 3.0 wt % of a corrosion inhibitor intensifier, and 0.01 to 0.75 wt % of a surfactant, each based on a total weight of the biodegradable descaler solution, at a pressure of 14 to 400 psi, where the iron-containing scale has a solubility of 75 to 95 g/L in the biodegradable descaler solution at a temperature of 100 to 150° C.

In some embodiments, the iron-containing scale comprises iron sulfide, iron carbonate, iron oxyhydroxide, and calcium carbonate.

In some embodiments, the iron sulfide selected from the group consisting of pyrrhotite ($Fe_7S_8$), troilite (hexagonal FeS), pyrite, (cubic $FeS_2$), mackinawite (tetragonal FeS), and marcasite (orthorhombic $FeS_2$)

In some embodiments, the corrosion inhibitor comprises at least one selected from the group consisting of a salt of a N,N-diallyl-N-benzyl dodecyl ammonium cation and 3,5-diiodotyrosine.

In some embodiments, the surfactant is an ionic surfactant.

In some embodiments, the ionic surfactant is sodium dodecyl sulfate.

In some embodiments, the corrosion inhibitor intensifier comprises at least one selected from the group consisting of tetrahydro-3,5-dimethyl-2H-1,3,5-thiadiazine-2-thione, methyl formate, and potassium iodide.

In some embodiments, the biodegradable descaler solution has a density of 0.90 to 1.25 $g/cm^3$ at 20 to 30° C.

In some embodiments, the biodegradable descaler solution has a viscosity of 1.4 to 1.8 cP at 20 to 30° C. and a surface tension of 30 to 33 mN/m at 20 to 30° C.

In some embodiments, the biodegradable descaler solution has a pH of −1.5 to −1.1 at 20 to 30° C.

In some embodiments, the contacting is performed at a temperature of 100 to 150° C.

In some embodiments, the contacting is performed for 1 to 48 hours.

In some embodiments, the method removes the iron-containing scale while causing a corrosion rate of steel of less than 0.049 $lb/ft^2$ per day at 100 to 150° C.

In some embodiments, the descaler solution is present at an initiation of the contacting in an amount of 1 L of descaler solution per every 75 to 100 g of iron-containing scale.

In some embodiments, the biodegradable descaler solution reaches a plateau of 75 to 99% of theoretical $CO_2$ by day 40 according to OECD 301B biodegradation test.

The present disclosure also relates to a biodegradable descaler solution comprising 55.75 to 80.49 wt % of water, 16.0 to 22.5 wt % of hydrochloric acid, 0.75 to 7.5 wt % of formic acid, 0.75 to 7.5 wt % of citric acid, 1.0 to 3.0 wt % of a corrosion inhibitor, 1.0 to 3.0 wt % of a corrosion inhibitor intensifier, and 0.01 to 0.75 wt % of a surfactant, each based on a total weight of the biodegradable descaler solution, wherein the iron-containing scale has a solubility of 75 to 95 g/L in the biodegradable descaler solution at a temperature of 100 to 150° C.

In some embodiments, the corrosion inhibitor comprises at least one selected from the group consisting of a salt of a N,N-diallyl-N-benzyl dodecyl ammonium cation and 3,5-diiodotyrosine.

In some embodiments, the corrosion inhibitor intensifier comprises at least one selected from the group consisting of tetrahydro-3,5-dimethyl-2H-1,3,5-thiadiazine-2-thione, methyl formate, and potassium iodide.

In some embodiments, the biodegradable descaler solution has a steel corrosion rate of less than 0.049 lb/ft$^2$ per day at 100 to 150° C.

In some embodiments, the biodegradable descaler solution has a density of 0.90 to 1.25 g/cm$^3$ at 20 to 30° C., a viscosity of 1.4 to 1.8 cP at 20 to 30° C., a surface tension of 30 to 33 mN/m at 20 to 30° C., and a pH of −1.5 to −1.1 at 20 to 30° C.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
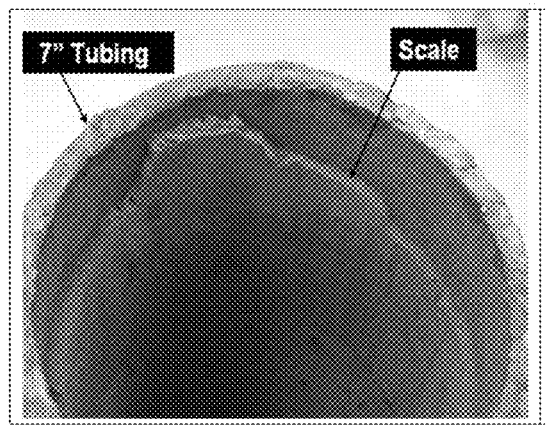
FIG. 1 is a photo of iron-containing scale deposited in a pipe.

Embodiments of the present disclosure will now be described more fully hereinafter with reference to the accompanying drawings, in which some, but not all embodiments of the disclosure are shown.

Definitions

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, the term "surfactant" refers to a compound that lowers the surface tension (or interfacial tension) between two liquids, between a liquid and a gas, or between a liquid and a solid. The surfactant may be a nonionic surfactant, an anionic surfactant, a cationic surfactant, a viscoelastic surfactant, or a zwitterionic surfactant. The surfactant may also be a gemini surfactant of any of the types listed previously. The surfactant may serve a role as a water-wetting agent, a defoamer, a foamer, a detergent, a dispersant, or an emulsifier.

Biodegradable Descaler Solution

According to a first aspect, the present disclosure relates to a method for removing an iron-containing scale from a wellbore, pipe, or other metal-containing surface. The method involves contacting the iron-containing scale with a biodegradable descaler solution. The biodegradable descaler solution comprises hydrochloric acid, formic acid, citric acid, a corrosion inhibitor, a corrosion inhibitor intensifier, a surfactant, and water. In some embodiments, the hydrochloric acid is present in an amount of 16 to 22.5 wt %, preferably 16.5 to 22 wt %, preferably 17 to 21.5 wt %, preferably 17.5 to 21 wt %, preferably 18 to 20.75 wt %, preferably 18.5 to 20.5 wt %, preferably 19 to 20.25 wt %, preferably 20 wt % based on a total weight of the biodegradable descaler solution. In some embodiments, the formic acid is present in an amount of 0.75 to 7.5 wt %, preferably 0.9 to 7 wt %, preferably 1 to 6.5 wt %, preferably 1.5 to 6 wt %, preferably 2 to 5.5 wt %, preferably 2.5 to 5.25 wt %, preferably 3 to 5 wt % based on a total weight of the biodegradable descaler solution. In some embodiments, the citric acid is present in an amount of 0.75 to 7.5 wt %, preferably 0.9 to 7 wt %, preferably 1 to 6.5 wt %, preferably 1.5 to 6 wt %, preferably 2 to 5.5 wt %, preferably 2.5 to 5.25 wt %, preferably 3 to 5 wt % based on a total weight of the biodegradable descaler solution. In some embodiments, a weight ratio of the formic acid to the citric acid present in the biodegradable descaler solution is 10:1 to 1:10, preferably 7:1 to 1:7, preferably 5:1 to 1:5, preferably 3.2:1 to 1:3.2, preferably 2.5:1 to 1:2.5, preferably 2:1 to 1:2, preferably 1.5:1 to 1:1.5, preferably 1.25:1 to 1:1.25, preferably 1:1. While other acids may be used, preferably they are not. Examples of other acids which may be used include acetic acid, propionic acid, lactic acid, hydrobromic acid, hydroiodic acid, chloric acid, perchloric acid, sulfuric acid, sulfurous acid, and phosphoric acid. Certain other acids, however, may not be used. Examples of other acids that may not be used include phosphonic acid, methanesulfonic acid, hydrofluoric acid, silicic acid, orthosilicic acid, fluorosilicic acid, and hexafluorophosphoric acids.

A corrosion inhibitor is a substance added to or used in combination with a substance which contacts metal surfaces such as a descaler or filter cake removal solution for the purpose of preventing or lessening the rate of corrosion of the metal surface exposed to the substance. The use of corrosion inhibitors is necessary to protect wellbores, pipes, and other metal-containing surfaces from corrosion damage caused by a descaler solution or method. Examples of corrosion inhibitors include benzoin, benzoin-(4-phenylthiosemicarbazone), benzyl-(4-phenylthiosemicarbazone), α-pyridoin, 2,2'-pyridil, salts of N-1-n-hexyl-phthalamate, salts of N-1-n-decyl-phthalamate, salts of N-1-n-tetradecyl-phthalamate, benzimidazole, 2-methylbenzimidazole, 2-aminobenzimidazole, 2-aminoethylbenzimidazole, 2-(2-pyridyl)benzimidazole, 2-hydroxybenzimidazole, 2-mercaptobenzimidazole, 1-benzylbenzimidazole, 1,2-dibenzylbenzimidazole, indole, 1H-benzotriazole, 1,2-benzothiazole, benzaldehyde, 4-amino-5-mercapto-1,2,4-triazole, 3-phenyl-4-amino-5-mercapto-1,2,4-triazole, 1,12-bis(1,2,4-triazolyl)dodecane, octyl alcohol, propargyl alcohol, piperidine, 2-methylpiperidine, 3-methylpiperidine, 4-methylpiperidine, 4-benzylpiperidine, 3,5-dimethylpiperidine, 2,6-dimethylpiperidine, 2-chloroaniline, 2-fluoroaniline, 2-methoxyaniline, 2-ethoxyaniline, 2-methylanniline, glycine, 2-(bis(2-aminoethyl)amino) acetic acid, cinnamaldehyde, benzalacetone, chalcone, 1,4-bis(2-pyridyl)-5H-pyridazino[4,5-b]indole, 3,5-bis(2-thienyl)-1,3,4-thiadiazole, 2-(undecyldimethyl-ammonio)butanol bromide, 2-(dodecyldimethyl-ammonio)butanol bromide, 2-(tridecyldimethyl-ammonio)butanol bromide, 2-(tetradecyldimethyl-ammonio)butanol bromide, 2-(pentadecyldimethyl-ammonio)butanol bromide, 2-hydroxy-1,4-naphthoquinone, gallic acid, α-D-glucose, tannic acid, 1-(2-pyridylazo)-2-naphthol, leucine, salts of N,N-diallyl-N-benzyl dodecyl ammonium cation, salts of N,N-diallyl-N'-formyl 1,6-hexanediammonium cation, N,N-dimethyl-N-benzyl dodecyl ammonium cation, salts of N,N-diallyl-N-propargyl-(12-N'-formylamino)-1-dodecyl ammonium cation, glutamic acid, methionine sulfoxide, methionine sulfone, creatine, N-phosphonomethylglycine, acetylcysteine, S-benzylcysteine, 2-(4(dimethylamino)benzylamino acetic acid, chlorotyrosine, bromotyrosine, iodotyrosine, dichlorotyrosine, dibromotyrosine, diiodotyrosine, chlorobromotyrosine, chlroroiodotyrosine, and bromoiodotyrosine.

In some embodiments, the corrosion inhibitor is present in an amount of 1 to 3 wt %, preferably 1.25 to 2.75 wt %, preferably 1.5 to 2.5 wt %, preferably 1.25 to 2.25 wt %, preferably 2 wt % based on a total weight of the biodegradable descaler solution. In some embodiments, the corrosion inhibitor comprises at least one selected from the group consisting of a salt of a N,N-diallyl-N-benzyl dodecyl ammonium cation and 3,5-diiodotyrosine.

A corrosion inhibitor intensifier (also called a corrosion inhibitor aid) is a substance which enhances the action of the corrosion inhibitor. This enhancement may come in the form of increasing the temperature at which the corrosion inhibitor is effective, increasing the time during which the corrosion inhibitor is effective, or inhibiting the decomposition of the corrosion inhibitor. Examples of corrosion inhibitor intensifiers include methyl formate, chloride salts of potassium, copper (II), bismuth, antimony (III), antimony (V), tin (II), arsenic (III), chromium (VI), nickel (II), magnesium, and calcium, bromide salts of potassium, copper (II), bismuth, antimony (III), antimony (V), tin (II), arsenic (III), chromium (VI), nickel (II), magnesium, and calcium, iodide salts of potassium, copper (II), bismuth, antimony (III), antimony (V), tin (II), arsenic (III), chromium (VI), nickel (II), magnesium, and calcium, $Sb_2O_3$, $Sb_2O_5$, $K_4Sb_2O_7$, $K_2H_2Sb_2O_7$, $Sb_2S_3$, $K_2Sb_2(C_4O_6H_4)_2$, $Sb[(CH_2OH)_2]_3$, BiOCl, $Bi_2O_3$, $BiOI_3$, $BiF_3$, bismuth tartrate, bismuth sub salicylate, and tetrahydro-3,5-dimethyl-2H-1,3,5-thiadiazine-2-thione.

In some embodiments, the corrosion inhibitor intensifier is present in an amount of 1 to 3 wt %, preferably 1.25 to 2.75 wt %, preferably 1.5 to 2.5 wt %, preferably 1.25 to 2.25 wt %, preferably 2 wt % based on a total weight of the biodegradable descaler solution. In some embodiments, the corrosion inhibitor intensifier comprises at least one selected from the group consisting of tetrahydro-3,5-dimethyl-2H-1,3,5-thiadiazine-2-thione, methyl formate, and potassium iodide.

A surfactant molecule comprises one or more hydrophilic head units attached to one or more hydrophobic tails. The tail of most surfactants comprises a hydrocarbon chain, which can be branched, linear, or aromatic. Fluorosurfactants have fluorocarbon chains. Siloxane surfactants have siloxane chains. Gemini surfactant molecules comprise two or more hydrophilic heads and two or more hydrophobic tails.

Many surfactants include a polyether chain terminating in a highly polar anionic group. The polyether groups often comprise ethoxylated (polyethylene oxide-like) sequences inserted to increase the hydrophilic character of a surfactant. Alternatively, polypropylene oxides may be inserted to increase the lipophilic character of a surfactant.

Anionic surfactants contain anionic functional groups at their head, such as sulfate, sulfonate, phosphate, and carboxylate. The anionic surfactant may be an alkyl sulfate, an alkyl ether sulfate, an alkyl ester sulfonate, an alpha olefin sulfonate, a linear alkyl benzene sulfonate, a branched alkyl benzene sulfonate, a linear dodecylbenzene sulfonate, a branched dodecylbenzene sulfonate, an alkyl benzene sulfonic acid, a dodecylbenzene sulfonic acid, a sulfosuccinate, a sulfated alcohol, a ethoxylated sulfated alcohol, an alcohol sulfonate, an ethoxylated and propoxylated alcohol sulfonate, an alcohol ether sulfate, an ethoxylated alcohol ether sulfate, a propoxylated alcohol sulfonate, a sulfated nonyl phenol, an ethoxylated and propoxylated sulfated nonyl phenol, a sulfated octyl phenol, an ethoxylated and propoxylated sulfated octyl phenol, a sulfated dodecyl phenol, and an ethoxylated and propoxylated sulfated dodecyl phenol. Other anionic surfactants include ammonium lauryl sulfate, sodium lauryl sulfate (sodium dodecyl sulfate, SLS, or SDS), and related alkyl-ether sulfates sodium laureth sulfate (sodium lauryl ether sulfate or SLES), sodium myreth sulfate, docusate (dioctyl sodium sulfosuccinate), perfluorooctanesulfonate (PFOS), perfluorobutanesulfonate, alkyl-aryl ether phosphates, and alkyl ether phosphates.

Cationic surfactants have cationic functional groups at their head, such as primary and secondary amines. Cationic surfactants include octenidine dihydrochloride; cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB).

Zwitterionic (amphoteric) surfactants have both cationic and anionic groups attached to the same molecule. Zwitterionic surfactants include CHAPS (3-[(3-cholamidopropyl)dimethylammonio]-1-propanesulfonate), cocamidopropyl hydroxysultaine, ocamidopropyl betaine, phospholipids, sultaine and sultaine derivatives, and sphingomyelins.

Nonionic surfactants have a polar group that does not have a charge. These include long chain alcohols that exhibit surfactant properties, such as cetyl alcohol, stearyl alcohol, cetostearyl alcohol, oleyl alcohol, and other fatty alcohols. Other long chain alcohols with surfactant properties include polyethylene glycols of various molecular weights, polyethylene glycol alkyl ethers having the formula $CH_3$—$(CH_2)_{10-16}$—$(O$—$C_2H_4)_{1-25}$—$OH$, such as octaethylene glycol monododecyl ether and pentaethylene glycol monododecyl ether; polypropylene glycol alkyl ethers having the formula: $CH_3$—$(CH_2)_{10-16}$—$(O$—$C_3H_6)_{1-25}$—$OH$; glucoside alkyl ethers having the formula $CH_3$—$(CH_2)_{10-16}$—$(O$-glucoside$)1$-$3$-$OH$, such as decyl glucoside, lauryl glucoside, octyl glucoside; polyethylene glycol octylphenyl ethers having the formula $C_8H_{17}$—$(C_6H_4)$—$(O$—$C_2H_4)_{1-25}$—$OH$, such as Triton X-100; polyethylene glycol alkylphenyl ethers having the formula $C_9H_{19}$—

($C_6H_4$)—(O—$C_2H_4$)$_{1-25}$—OH, such as nonoxynol-9; glycerol alkyl esters such as glyceryl laurate; polyoxyethylene glycol sorbitan alkyl esters such as polysorbate, sorbitan alkyl esters, cocamide MEA, cocamide DEA, dodecyldimethylamine oxide, block copolymers of polyethylene glycol and polypropylene glycol, such as poloxamers, and polyethoxylated tallow amine (POEA).

A dendritic surfactant molecule may include at least two lipophilic chains that have been joined at a hydrophilic center and have a branch-like appearance. In each dendritic surfactant, there may be from about 2 lipophilic moieties independently to about 4 lipophilic moieties attached to each hydrophilic group, or up to about 8 lipophilic moieties attached to the hydrophilic group for example. "Independently" as used herein with respect to ranges means that any lower threshold may be combined with any upper threshold. The dendritic surfactant may have better repulsion effect as a stabilizer at an interface and/or better interaction with a polar oil, as compared with other surfactants. Dendritic surfactant molecules are sometimes called "hyperbranched" molecules.

A dendritic extended surfactant is a dendritic surfactant having a non-ionic spacer arm between the hydrophilic group and a lipophilic tail. For example, the non-ionic spacer-arm extension may be the result of polypropoxylation, polyethoxylation, or a combination of the two with the polypropylene oxide next to the tail and polyethylene oxide next to the head. The spacer arm of a dendritic extended surfactant may contain from about 1 independently to about 20 propoxy moieties and/or from about 0 independently to about 20 ethoxy moieties. Alternatively, the spacer arm may contain from about 2 independently up to about 16 propoxy moieties and/or from about 2 independently up to about 8 ethoxy moieties. "Independently" as used herein with respect to ranges means that any lower threshold may be combined with any upper threshold. The spacer arm extensions may also be formed from other moieties including, but not necessarily limited to, glyceryl, butoxy, glucoside, isosorbide, xylitols, and the like. For example, the spacer arm of a dendritic extended surfactant may contain both propoxy and ethoxy moieties. The polypropoxy portion of the spacer arm may be considered lipophilic; however, the spacer arm may also contain a hydrophilic portion to attach the hydrophilic group. The hydrophilic group may generally be a polyethoxy portion having about two or more ethoxy groups. These portions are generally in blocks, rather than being randomly mixed. Further, the spacer arm extension may be a poly-propylene oxide chain.

Another type of surfactant is a viscoelastic surfactant (VES). Conventional surfactant molecules are characterized by having one long hydrocarbon chain per surfactant headgroup. In a viscoelastic gelled state these molecules aggregate into worm-like micelles. A viscoelastic gel is a gel that has elastic properties, meaning that the gel at least partially returns to its original form when an applied stress is removed. Typical viscoelastic surfactants include N-erucyl-N,N-bis(2-hydroxyethyl)-N-methyl ammonium chloride and potassium oleate, solutions of which form gels when mixed with inorganic salts such as potassium chloride and/or with organic salts such as sodium salicylate. Previously described surfactants may also be considered viscoelastic surfactants.

In some embodiments, the surfactant is an ionic surfactant. In some embodiments, the ionic surfactant is an anionic surfactant. In some embodiments, the anionic surfactant is sodium dodecyl sulfate.

In some embodiments, the surfactant is present in an amount of 0.0075 to 0.75 wt %, preferably 0.01 wt % to 0.7 wt %, preferably 0.05 to 0.65 wt %, preferably 0.075 to 0.50 wt %, preferably 0.1 to 0.4 wt %, preferably 0.15 to 0.35 wt %, preferably 0.175 to 0.325 wt %, preferably 0.2 to 0.3 wt %, preferably 0.225 to 0.275 wt %, preferably 0.25 wt % based on a total weight of biodegradable descaler solution.

In some embodiments, water is present in an amount of 55.75 to 80.49 wt %, preferably 56 to 80 wt %, preferably 58 to 78 wt %, preferably 60 to 76 wt %, preferably 61 to 74 wt %, preferably 62 to 73 wt %, preferably 63 to 72 wt %, preferably 64 to 71 wt %, preferably 65 to 70 wt %, preferably 65.75 to 69.75 wt % based on a total weight of biodegradable desclaer solution.

In some embodiments, the biodegradable acid solution is substantially free of a chelating agent. Examples of chelating agents include ethylene diamine tetraacetic acid (EDTA), glutamic acid N,N-di-acetic acid or a salt thereof (GLDA), aspartic acid N,N-diacetic acid or a salt thereof (ASDA), methylglycine N,N-diacetic acid or a salt thereof (MGDA), and N-hydroxyethyl ethylenediamine-N,N',N'-triacetic acid or a salt thereof (HEDTA).

In some embodiments, the biodegradable descaler solution has a density of 0.90 to 1.25 g/cm$^3$, preferably 0.91 to 1.24 g/cm$^3$, preferably 0.92 to 1.23 g/cm$^3$, preferably 0.93 to 1.22 g/cm$^3$, preferably 0.94 to 1.21 g/cm$^3$, preferably 0.95 to 1.20 g/cm$^3$, preferably 0.96 to 1.19 g/cm$^3$, preferably 0.97 to 1.18 g/cm$^3$, preferably 0.98 to 1.17 g/cm$^3$, preferably 0.99 to 1.16 g/cm$^3$, preferably 1.00 to 1.15 g/cm$^3$, preferably 1.01 to 1.14 g/cm$^3$, preferably 1.02 to 1.13 g/cm$^3$, preferably 1.03 to 1.12, preferably 1.04 to 1.11 g/cm$^3$, preferably 1.05 to 1.10 g/cm$^3$ at 20 to 30° C., preferably 22.5 to 27.5° C., preferably 23 to 27° C., preferably 25° C. In some embodiments, the biodegradable descaler solution has a viscosity of 1.5 to 1.7 cP, preferably 1.51 to 1.65 cP, preferably 1.52 to 1.64 cP, preferably 1.53 to 1.63 cP, preferably 1.54 to 1.62 cP, preferably 1.55 to 1.61 cP, preferably 1.56 to 1.59 cP, preferably 1.57 to 1.58 cP at 20 to 30° C., preferably 22.5 to 27.5° C., preferably 23 to 27° C., preferably 25° C. In some embodiments, the biodegradable descaler solution has a surface tension of 30 to 33 mN/m, preferably 30.25 to 32.75 mN/m, preferably 30.5 to 32.5 mN/m, preferably 30.75 to 32.25 mN/m, preferably 31 to 32 mN/m, preferably 31.1 to 31.8 mN/m, preferably 31.2 to 31.6 mN/m, preferably 31.3 to 31.5 mN/m, preferably 31.4 mN/m at 20 to 30° C., preferably 22.5 to 27.5° C., preferably 23 to 27° C., preferably 25° C. In some embodiments, the biodegradable descaler solution has a pH of −1.5 to −1.1, preferably −1.45 to −1.15, preferably −1.4 to −1.2, preferably −1.35 to −1.22, preferably −1.32 to −1.25, preferably −1.31 to −1.27, preferably −1.30 to −1.28, preferably −1.29 at a temperature of 20 to 30° C., preferably 22.5 to 27.5° C., preferably 23 to 27° C., preferably 25° C.

In some embodiments, the biodegradable descaler solution may be formed by adding and mixing components that comprise the biodegradable descaler solution in any order, and then continuing to mix until a stable, uniform mixture is formed. In one embodiment, the biodegradable descaler solution may be formed by starting with a solvent, such as water, brine, seawater, or freshwater, adding a component, mixing to uniformity, and then repeating for the remaining steps. Alternatively, two or more components may be added at a time and mixed, and in one embodiment, the biodegradable descaler solution may be heated while mixing, for example, to a temperature of 110 to 200° F., preferably 150 to 180° F., in order to more quickly dissolve certain components. The mixing may be performed by flowing through or across a static mixer, or with a turbine, blade, impeller, drum mixer, stir bar, paddle, or through some other form of agitation or blending.

Method for Removing Iron-Containing Scale

Scale is a deposit or coating formed on the surface of metal, rock, or other material that is formed by the precipitation of insoluble materials. Scale may cause undesirable or hazardous conditions or adversely affect operating conditions in a wellbore, in a pipe, or on a metal-containing surface of equipment associated with an oil well. Examples of insoluble materials that may be components of scale include calcium carbonate, calcium sulfate, barium carbonate, barium sulfate, strontium carbonate, strontium sulfate, iron oxide, iron sulfide, iron carbonate, iron hydroxide, magnesium hydroxide, magnesium oxide, silicates such as serpentine, acmite, gyrolite, gehlenite, amorphous silica, quartz, cristobalite, and pectolite, aluminum oxyhydroxide, aluminosilicates such as analcite, cancrinite, and noselite, and hydroxyapatite. Scale is typically classified by its component materials. Calcium carbonate scale (also called limescale) is scale that contains calcium and/or magnesium carbonates but does not contain more than approximately 10 wt % of either sulfate materials or iron-containing materials based on a total weight of the scale. Sulfate scale is scale that contains one or more sulfate-containing materials present in an amount greater than 50 wt % of the total weight of the scale, but does not contain more than approximately 10 wt % of iron-containing material. Sulfate scale may contain calcium and/or magnesium carbonates. Iron-containing scale (also called iron scale or ironscale) is scale that contains one or more iron-containing materials present in an amount greater than 50 wt % of the total weight of the scale, but does not contain more than approximately 10 wt % of sulfate-containing materials based on a total weight of the scale. Scales that have a composition that do not fit either calcium carbonate scale, sulfate scale, or iron-containing scale may be known as "mixed scale". Examples of iron-containing materials that may be present in iron-containing scale include pyrrhotite ($Fe_7S_8$), troilite (hexagonal FeS), pyrite, (cubic $FeS_2$), mackinawite (tetragonal FeS), marcasite (orthorhombic $FeS_2$), hibbingite ($Fe(OH)_3Cl$), siderite ($FeCO_3$), goethite ($\alpha$-FeOOH), akaganeite ($\beta$-FeOOH), and ankerite ($Ca(Fe, Mg, Mn)(CO_3)_2$).

In some embodiments, the iron-containing scale comprises iron sulfide, iron carbonate, iron oxyhydroxide, and calcium carbonate. In some embodiments, iron sulfide is present in the iron-containing scale in an amount of 65 to 75 wt %, preferably 66 to 74 wt %, preferably 67 to 73 wt %, preferably 68 to 72 wt %, preferably 69 to 71 wt %, preferably 70 wt % based on a total weight of iron-containing scale. In some embodiments, the iron sulfide is selected from the group consisting of pyrrhotite ($Fe_7S_8$), troilite (hexagonal FeS), pyrite, (cubic $FeS_2$), mackinawite (tetragonal FeS), and marcasite (orthorhombic $FeS_2$). In some embodiments, the iron sulfide comprises a single phase. In alternative embodiments, the iron sulfide comprises more than one phase. In some embodiments, siderite ($FeCO_3$) is present in an amount of 1 to 5 wt %, preferably 1.5 to 4.5 wt %, preferably 2 to 4 wt %, preferably 2.5 to 3.5 wt %, preferably 3 wt % based on a total weight of iron-containing scale. In some embodiments, iron oxyhydroxide is present in an amount of 2 to 6 wt %, preferably 2.5 to 5.5 wt %, preferably 3 to 5 wt %, preferably 3.5 to 4.5 wt %, preferably 4 wt % based on a total weight of iron-containing scale. In some embodiments, the iron oxyhydroxide comprises $\alpha$-FeOOH. In some embodiments, the iron oxyhydroxide comprises $\beta$-FeOOH. In some embodiments, the iron oxyhydroxide comprises both $\alpha$-FeOOH and $\beta$-FeOOH. In some embodiments, calcium carbonate is present in an amount of 14 to 32 wt %, preferably 16 to 30 wt %, preferably 18 to 25 wt %, preferably 19 to 22.5 wt %, preferably 20 to 22 wt %, preferably 21 wt % based on a total weight of iron-containing scale. In some embodiments, the calcium carbonate comprises calcite. In some embodiments, the calcium carbonate comprises ankerite. In some embodiments, the calcium carbonate comprises both calcite and ankerite.

In some embodiments, the iron-containing scale has a solubility in the biodegradable descaler solution of 75 to 95 g/L, preferably 77.5 to 92.5 g/L, preferably 79 to 90 g/L, preferably 79.5 to 87.5 g/L, preferably 80 to 85 g/L, preferably 80.5 to 84 g/L, preferably 81 to 83.5 g/L at a temperature of 100 to 150° C., preferably 105 to 145° C., preferably 110 to 140° C., preferably 115 to 135° C., preferably 120 to 130° C., preferably 122.5 to 127.5° C., preferably 125° C.

In some embodiments, the contacting is performed at a pressure of 14 to 400 psi, preferably 50 to 390 psi, preferably 75 to 380 psi, preferably 100 to 370 psi, preferably 150 to 360 psi, preferably 175 to 350 psi, preferably 200 to 340 psi, preferably 225 to 330 psi, preferably 250 to 320 psi, preferably 275 to 310 psi, preferably 300 psi. In some embodiments, the contacting is performed at a temperature of 100 to 150° C., preferably 105 to 145° C., preferably 110 to 140° C., preferably 115 to 135° C., preferably 120 to 130° C., preferably 122.5 to 127.5° C., preferably 125° C. In some embodiments, the contacting is performed for 1 to 48 hours, preferably 4 to 44 hours, preferably 8 to 40 hours, preferably 12 to 36 hours, preferably 14 to 34 hours, preferably 16 to 32 hours, preferably 18 to 30 hours, preferably 19 to 24 hours, preferably 20 hours.

In some embodiments, the biodegradable descaler solution is used in the contacting in an amount of 1 L per every 75 to 95 g, preferably 1 L per every 77.5 to 92.5 g, preferably 1 L per every 79 to 90 g, preferably 1 L per every 79.5 to 87.5 g, preferably 1 L per every 80 to 85 g, preferably 1 L per every 80.5 to 84 g, preferably 1 L per every 81 to 83.5 g of iron-containing scale. In some embodiments, greater than 92.5%, preferably greater than 93%, preferably greater than 93.5%, preferably greater than 94%, preferably greater than 94.5%, preferably greater than 95%, preferably greater than 95.5%, preferably greater than 96%, preferably greater than 96.5%, preferably greater than 97%, preferably greater than 97.5%, preferably greater than 98%, preferably greater than 98.5%, preferably greater than 99% of a volume of the iron-containing scale is removed by the method.

In some embodiments, the iron-containing scale is removed by dissolving. Dissolving an iron-containing scale, as described here, means that the iron-containing scale may break apart, partially or completely dissolve, disperse, or disintegrate from a surface of a wellbore or other metal-containing surface or from a portion of an iron-containing scale. A method to dissolve an iron-containing scale may be considered a "treatment," or a method of "treating" or "removing" an iron-containing scale from a surface. In some embodiments, the surface is a wall of a wellbore, which may comprise shale, carbonate, sandstone, other minerals, rocks, or geological formations. In other embodiments, the surface may be concrete, a steel casing, a drill bit, an autoclave, a steel coupon, a ceramic filter, glass, or a glass frit. In some embodiments, the dissolving and removing of an iron-containing scale as described by the method is a result of the components of the biodegradable descaler solution reacting with different compounds within the iron-containing scale, as previously described. In some embodiments, the dissolving and removing may also result from the physical turbulence or flow of fluids against the iron-containing scale, or by diffusion of a fluid into an iron-containing scale or between an iron-containing scale and the surface.

In preferred embodiments, the iron-containing scale is present in the wellbore, pipe, or other metal-containing surface as a continuous covering in direct contact with the metal surface, e.g., a coating that is circumferentially present in a pipe.

In practice, the method of removing an iron-containing scale from a wellbore can be applied in various ways. For example, the biodegradable descaler solution can be injected into the wellbore to dissolve the iron-containing scale within. Alternatively, the biodegradable descaler solution can be injected directly at the site of an iron-containing scale. Alternatively, the biodegradable descaler solution can be allowed to circulate in the wellbore for a certain period of time. Alternatively, the biodegradable descaler solution may be left in the wellbore to soak the iron-containing scale. Alternatively, the wellbore containing the iron-containing scale may be pre-washed by water and/or mutual solvent and/or pretreated with a surfactant before being treated with the biodegradable descaler solution. Alternatively, the biodegradable descaler solution may be flowed through a tube or pipe to dissolve the iron-scale within. In some embodiments, the biodegradable descaler solution may be flowed through a tube or pipe at a flow rate of 0.00001 to 1000 L/min, preferably 0.0001 to 100 L/min, preferably 0.001 to 10 L/min. Alternatively, the biodegradable descaler solution may be left in the tube or pipe to soak the iron-containing scale. Alternatively, the biodegradable descaler solution may be circulated through a portion of a tube or pipe in which liquid is able to flow to remove a blockage comprising the iron-containing scale from a portion of the tube or pipe in which liquid is not able to flow. In some embodiments, the biodegradable descaler solution is used in a diluted form. In some embodiments, the biodegradable descaler solution is diluted with water. In alternative embodiments, the biodegradable descaler solution is not used in a diluted form.

The method of the present disclosure is applicable in numerous different environments. It can be used to remove iron-containing scale produced from drilling, production, completion, workover, or stimulation activity, either produced intentionally or unintentionally. It can be used in screen-only completions or gravel pack completions, an open hole or a cased hole, vertical or highly deviated wells. The biodegradable descaler solution may be used as single-application soak or circulating fluid in which the biodegradable descaler solution also serves as a carrier fluid for, e.g., a gravel pack operation; in conjunction with a gelling agent or viscoelastic surfactant (e.g., ClearFRAC™) or alone, with a variety of clean-up tools and other fluid additives (e.g., anti-corrosive agents) or dissolution components. Since the problem of placement and uniform dissolution are present in virtually every instance, the biodegradable descaler solution and method of the present disclosure are readily applicable to any scenario in which it is desirable to remove a calcium-containing filter cake from a wellbore or near-wellbore region in a formation, regardless of whether the iron-containing scale is produced during drilling or during other post-drilling operations (e.g., fluid-loss control pill, gravel pack operation, fracturing, matrix acidizing, and so forth).

Following the contacting, in some embodiments, the method may further comprise a step of flushing away a dispersed iron-containing scale with a low concentration of organic or non-organic acid as commonly known in the art to increase permeability.

Scale removal methods must not be overly damaging to the material of the wellbore, production pipe, or other equipment associated with oil extraction. One standardized way of quantifying such damage is too measure the corrosion rate of steel under conditions used in the scale removal method. Various test standards and protocols have been developed for determining the corrosion rate. A standard benchmark is that the method causes a corrosion rate of steel less than 0.05 lb/ft$^2$ of exposed steel per day under the conditions of the method. In some embodiments, the method removes the iron-containing scale while causing a corrosion rate of steel less than 0.049 lb/ft$^2$ per day, preferably less than 0.048 lb/ft$^2$ per day, preferably less than 0.047 lb/ft$^2$ per day, preferably less than 0.046 lb/ft$^2$ per day, preferably less than 0.045 lb/ft$^2$ per day, preferably less than 0.044 lb/ft$^2$ per day, preferably less than 0.043 lb/ft$^2$ per day, preferably less than 0.042 lb/ft$^2$ per day, preferably less than 0.041 lb/f$^2$ per day, preferably less than 0.040 lb/ft$^2$ per day at a temperature of 100 to 150° C., preferably 105 to 145° C., preferably 110 to 140° C., preferably 115 to 135° C., preferably 120 to 130° C., preferably 122.5 to 127.5° C., preferably 125° C.

As defined here, steel is an alloy having 55-99.98 wt %, preferably 60-99.96 wt % of elemental iron, and may further comprise carbon, chromium, aluminum, nickel, molybdenum, manganese, vanadium, tungsten, cobalt, titanium, niobium, copper, zirconium, calcium, boron, phosphorus, and/or silicon. The steel may be a low-carbon steel, a medium-carbon steel, a high-carbon steel, or an ultrahigh-carbon steels. Each has a different carbon content, wherein the carbon content has an effect on mechanical properties, with increasing carbon content leading to increased hardness and strength. More preferably, the physical properties and chemical composition of the carbon steel are suitable for application in subterranean formations, including elevated temperatures and pressures, flow of gases, fluids and solids and the presence of corrosive gases. Preferred carbon steels are carbon steels wherein at least one of manganese or chromium is present in an amount of 0.75 wt % in relation to the total steel alloy weight. These carbon steels include, but are not limited to, N-80, L-80, P-110, Q-125, J-55, C-75, C-90, C-95, QT-800, QT-900, 5LX-42, and 5LX-52 carbon steels.

In one embodiment the steel is low-carbon steel, which contains up to 0.30 wt % carbon with respect to a total weight of the steel alloy. The carbon content for high-formability steels is less than 0.10 wt % of carbon, with up to 0.4 wt % manganese with respect to a total weight of the steel alloy. For rolled steel structural plates and sections, the carbon content may be increased to approximately 0.30 wt %, with higher manganese content up to 1.5 wt %. These materials may be used for stampings, forgings, seamless tubes, and boiler plates.

In another embodiment the steel is medium-carbon steel, with medium-carbon steels being similar to low-carbon steels except that the carbon content ranges from 0.30 to 0.60 wt % and the manganese content ranges from 0.60 to 1.65 wt % with respect to a total weight of the steel alloy.

In yet another embodiment the steel is a high-carbon steel, with high-carbon steels containing from 0.60 to 1.00 wt % of carbon with manganese contents ranging from 0.30 to 0.90 wt % with respect to a total weight of the steel alloy.

In another embodiment the steel is an ultrahigh-carbon steel, with ultrahigh-carbon steels being experimental alloys containing 1.25 to 2.0 wt % carbon with respect to a total weight of the steel alloy.

One metric by which a descaler solution may be considered environmentally-friendly is to be biodegradable. A standard method of determining biodegradability is the OCED 301B biodegradation test. This test inoculates a biodegradation solution containing the substances or solution to be tested with a microorganism and incubates the biodegradation solution in the dark or diffuse light. The amount of carbon dioxide produced is measured and compared to a calculated amount of carbon dioxide called the "theoretical $CO_2$". In order to be designated readily biodegradable, 70% of dissolved oxygen content is removed from the biodegradation solution and 60% of theoretical $CO_2$ is produced. In some embodiments, the biodegradable descaler solution reaches a plateau of 75 to 99%, preferably 77.5 to 95%, preferably 80 to 90%, preferably 81 to 87.5% of theoretical $CO_2$ by day 40 according to OECD 301B biodegradation test.

EXAMPLES

Example 1

Materials

An actual field iron scale sample was obtained and the composition was determined using X-ray diffraction (XRD). Table 1 lists the XRD analysis of the iron scale sample which contains Pyrrhotite ($Fe_7S_8$) at a percentage of 55%, 8% of Pyrite ($FeS_2$), 6% of Troilite (hexagonal FeS), and 21% of calcium carbonate ($CaCO_3$).

TABLE 1

XRD results for actual iron scale sample.

| Component | Chemical formula | Percentage % |
| --- | --- | --- |
| Pyrrhotite | $Fe_7S_8$ | 55 |
| Troilite | FeS | 6 |
| Mackinawite | FeS | 1 |
| Pyrite | $FeS_2$ | 8 |
| Hibbingite | $Fe(OH)_3Cl$ | 2 |
| Siderite | $FeCO_3$ | 3 |
| Geothite | $a$-FeOOH | 1 |
| Akaganeite | $\beta$-FeOOH | 3 |
| Calcite | $CaCO_3$ | 21 |

The biodegradable descaler solution (BDS) in concentrated (100%) form was composed of hydrochloric acid (HCl) in an amount of 20 wt. %, formic acid in an amount of 3-5 wt. %, citric acid in an amount of 3-5 wt. %, a corrosion inhibitor in an amount of 2 wt %, a corrosion inhibitor intensifier in an amount of 2 wt %, and water wetting surfactant in an amount of less than 0.5 wt. %. The remaining weight of the DBS is deionized water (65.75 to 69.75 wt. %). This concentrated form was diluted to 75% with deionized water. Corrosion inhibitor based on amino acids such as 3,5-diiodotyrosine was used and corrosion intensifier such as tetrahydro-3,5-dimethyl-2H-1,3,5-thiadiazine-2-thione was used.

The BDS had a density of 1.1 $gm/cm^3$, viscosity of 1.58 cP, the surface tension of 31.4 mN/m and a pH of −1.29. These aforementioned properties were measured at ambient temperature. Glutamic acid diacetic acid (GLDA, 20 wt. %) with a pH of 4 was obtained from a service company. HDC-3 with a pH of 14 was obtained from a service company.

Example 2

Solubility Test

Figure 2:
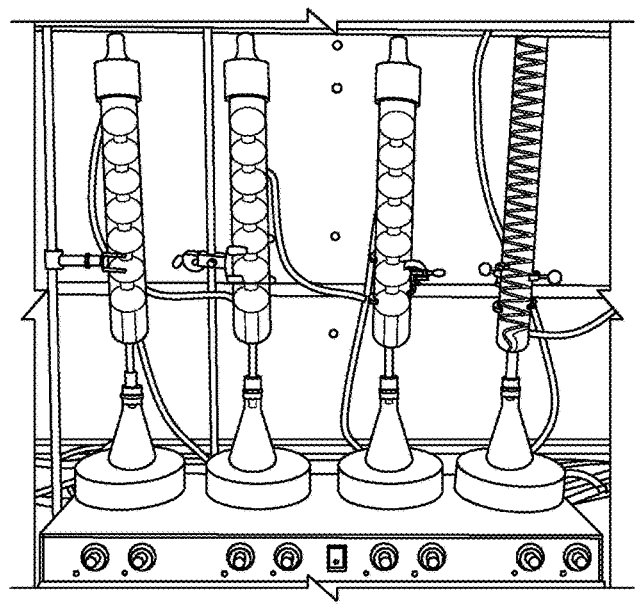
FIG. 2 is a depiction of the experimental setup used to determine iron-containing scale solubility in the biodegradable descaler solution.

The solubility test was conducted at 125° C. under static conditions for different time period using a hot rolling magnetic stirrer with a ratio of solid to liquid of 2 g:20 $cm^3$. The apparatus used for the solubility test is shown in FIG. 2.

Figure 3:
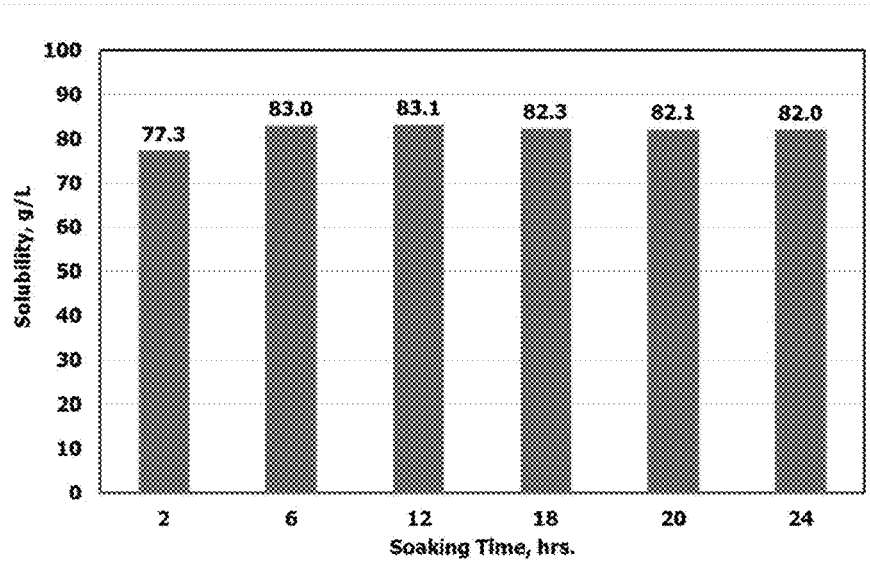
FIG. 3 is a plot of the solubility of the iron-containing scale in the biodegradable descaler solution at different soaking times.

The BDS (75 wt. %) was used to remove the iron scale sample at 125° C. FIG. 3 shows that the solubility was 77 g/lit. after 2 hrs, and increased to 83 g/lit after 6 hrs. After 24 hrs, the solubility was 82 g/lit. The obtained results confirmed that the BDS can be used with a concentration of 75 wt. % to remove the iron scale sample with high efficiency for 6 hrs only.

Figure 4:
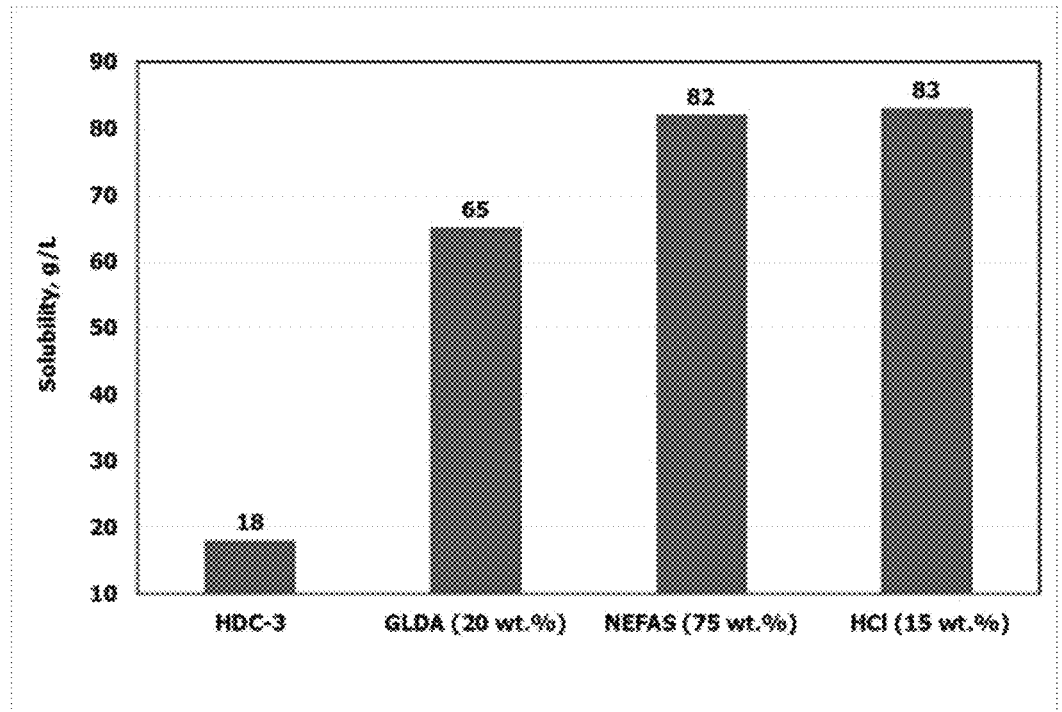
FIG. 4 is a plot of the maximum solubility of the iron-containing scale in the biodegradable descaler solution and other common solutions for removing iron-containing scale.

The solubility test was performed using different acid systems for 24 hrs at 125° C. FIG. 4 shows that the solubility of HDC-3 was low (18 g/lit) after 24 hrs. GLDA (20 wt. %, pH 4) has a moderate solubility (65%) after 24 hrs. HCl (15 wt. %) has the highest solubility 83 g/lit after 24 hrs. The BDS has the same solubility of HCl (15 wt. %) after only 6 hrs. for further comparison, the corrosion test was conducted for the BDS and HCl.

Example 3

Corrosion Test

Figure 5:
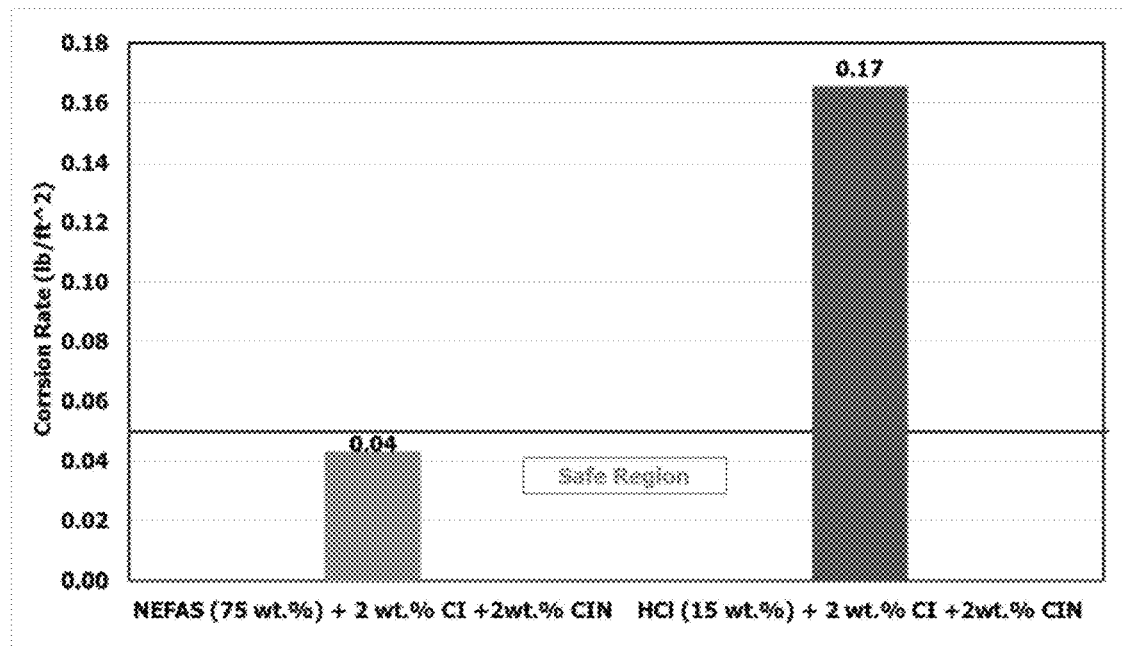
FIG. 5 is a plot of the corrosion rate of the biodegradable descaler solution compared with hydrochloric acid.

The corrosion test was conducted using actual steel coupon which was soaked with HCl (15 wt. %) and the BDS (75 wt. %) for 6 hrs at 125° C. FIG. 5 shows that the corrosion rate of HCl (15 wt. %) was higher than the actable range of oil and gas industry where it was 0.17 $lb/ft^2$ and the actable corrosion rate is 0.05 $lb/ft^2$. The corrosion rate of the BDS (75 wt. %) was 0.04 $lb/ft^2$ after adding the CI (2 wt. %) and corrosion intensifier (2 wt. %). Based on these results, it can be concluded that the BDS outperformed the HCl in solubility and corrosion in addition to its biodegradability.

Example 4

Biodegradable Test

BDS is a green acid solution synthesized by a catalytic-reagent combination added to HCl creating a biodegradable, non-bioaccumulating alternative to inhibited and potentially hazardous HCl. The synthesis removes the exothermic reaction created when water is added to HCl and significantly increases the strength of the acid, simultaneously creating a Cathodic stimulation reducing the corrosiveness by a factor of 50 at ambient temperatures.

OECD 301B is an aerobic biodegradation test that introduces a material to an inoculum in a closed environment and measures biodegradation of the material by $CO_2$ evolution BDS samples were provided to an accredited independent laboratory where by using OECD301B Biodegradation testing it was determined that GBRA achieved a plateau of 81% using theoretical carbon dioxide evaluation ($ThCO_2$) measurement by day 40 exceeding the requirements for Ready Biodegradability. The developed fluid had a density of 1.1 $gm/cm^3$, viscosity of 1.58 cP, the surface tension of 31.4 mN/m and a pH of −1.29. These aforementioned properties were measured at ambient temperature.

The invention claimed is:

1. A method for removing an iron-containing scale from a wellbore, pipe, or other metal-containing surface, the method comprising:
   contacting the iron-containing scale with a biodegradable descaler solution comprising 55.75 to 80.49 wt % of water,
16.0 to 22.5 wt % of hydrochloric acid,
0.75 to 7.5 wt % of formic acid,
0.75 to 7.5 wt % of citric acid,
1.0 to 3.0 wt % of a corrosion inhibitor,
1.0 to 3.0 wt % of a corrosion inhibitor intensifier, and
0.01 to 0.75 wt % of a surfactant, each based on a total weight of the biodegradable descaler solution;
wherein the biodegradable descaler solution is contacted with the iron-containing scale at a pressure of 14 to 400 psi, and
wherein the iron-containing scale has a solubility of 75 to 95 g/L in the biodegradable descaler solution at a temperature of 100 to 150° C.,
wherein 70% of dissolved oxygen content is removed and 60% of theoretical $CO_2$ is produced by the biodegradable descaler solution according to OECD 301B biodegradation test.

2. The method of claim 1, wherein the iron-containing scale comprises iron sulfide, iron carbonate, iron oxyhydroxide, and calcium carbonate.

3. The method of claim 2, wherein the iron sulfide is one or more selected from the group consisting of pyrrhotite ($Fe_7S_8$), troilite (hexagonal FeS), pyrite, (cubic $FeS_2$), mackinawite (tetragonal FeS), and marcasite (orthorhombic $FeS_2$).

4. The method of claim 1, wherein the corrosion inhibitor is at least one selected from the group consisting of a salt of a N,N-diallyl-N-benzyl dodecyl ammonium cation and 3,5-diiodotyrosine.

5. The method of claim 1, wherein the surfactant is an ionic surfactant.

6. The method of claim 5, wherein the ionic surfactant is sodium dodecyl sulfate.

7. The method of claim 1, wherein the corrosion inhibitor intensifier is at least one selected from the group consisting of tetrahydro-3,5-dimethyl-2H-1,3,5-thiadiazine-2-thione, methyl formate, and potassium iodide.

8. The method of claim 1, wherein the biodegradable descaler solution has a density of 0.90 to 1.25 $g/cm^3$ at 20 to 30° C.

9. The method of claim 1, wherein the biodegradable descaler solution has a viscosity of 1.4 to 1.8 cP at 20 to 30° C. and a surface tension of 30 to 33 mN/m at 20 to 30° C.

10. The method of claim 1, wherein the biodegradable descaler solution has a pH of −1.5 to −1.1 at 20 to 30° C.

11. The method of claim 1, wherein the contacting is performed at a temperature of 100 to 150° C.

12. The method of claim 1, wherein the contacting is performed for 1 to 48 hours.

13. The method of claim 1, wherein the method removes the iron-containing scale while causing a corrosion rate of steel of less than 0.049 $lb/ft^2$ per day at 100 to 150° C.

14. The method of claim 1, wherein the biodegradable descaler solution is present at an initiation of the contacting in an amount of 1 L of biodegradable descaler solution per every 75 to 100 g of iron-containing scale.

15. The method of claim 1, wherein the biodegradable descaler solution reaches a plateau of 75 to 99% of theoretical $CO_2$ by day 40 according to OECD 301B biodegradation test.

* * * * *